(12) United States Patent
Choi (10) Patent No.: US 12,415,421 B2
(45) Date of Patent: Sep. 16, 2025

(54) METHOD AND SYSTEM FOR PROVIDING ENTERTAINMENT

(71) Applicant: HYUNDAI MOBIS CO., LTD., Seoul (KR)

(72) Inventor: Chan Gill Choi, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 178 days.

(21) Appl. No.: 18/238,150

(22) Filed: Aug. 25, 2023

(65) Prior Publication Data

US 2024/0149671 A1  May 9, 2024

(30) Foreign Application Priority Data

Nov. 7, 2022 (KR) .................. 10-2022-0146871

(51) Int. Cl.
*B60K 35/00* (2024.01)
*A63F 13/803* (2014.01)
*A63F 13/837* (2014.01)
*B60K 35/22* (2024.01)
*B60K 35/28* (2024.01)
*B60K 35/29* (2024.01)
*G06F 3/14* (2006.01)

(52) U.S. Cl.
CPC .............. *B60K 35/29* (2024.01); *G06F 3/14* (2013.01); *A63F 13/803* (2014.09); *A63F 13/837* (2014.09); *A63F 2300/8082* (2013.01); *B60K 35/22* (2024.01); *B60K 35/28* (2024.01); *B60K 2360/16* (2024.01)

(58) Field of Classification Search
None
See application file for complete search history.

(56) References Cited

U.S. PATENT DOCUMENTS

| | | | | |
|---|---|---|---|---|
| 9,809,165 | B1 * | 11/2017 | Misu ...................... | B60K 35/60 |
| 2002/0003571 | A1 * | 1/2002 | Schofield ............... | B60K 35/28 |
| | | | | 348/148 |
| 2002/0120371 | A1 * | 8/2002 | Leivian .................. | G07C 5/085 |
| | | | | 701/1 |
| 2010/0265345 | A1 * | 10/2010 | Andersson ............... | B60R 1/24 |
| | | | | 348/216.1 |
| 2015/0331238 | A1 * | 11/2015 | Roth ...................... | B60K 37/00 |
| | | | | 348/115 |
| 2016/0379412 | A1 * | 12/2016 | Butler .................... | G02B 27/01 |
| | | | | 345/633 |
| 2017/0212345 | A1 * | 7/2017 | Ruiter .................... | G02B 27/01 |
| 2020/0398667 | A1 * | 12/2020 | Emura ............... | B60N 2/02246 |
| 2024/0104864 | A1 * | 3/2024 | Mulliken .............. | G06T 19/006 |
| 2024/0149671 | A1 * | 5/2024 | Choi ....................... | G09G 5/37 |

\* cited by examiner

*Primary Examiner* — Jason A Pringle-Parker
(74) *Attorney, Agent, or Firm* — Morgan, Lewis & Bockius LLP (57) ABSTRACT

A method and a system for providing entertainment is disclosed herein. According to an embodiment of the present disclosure, the system for providing entertainment is mounted on a vehicle. In some embodiments, the system for providing entertainment comprises a display unit configured to display an image and a control unit configured to provide a content to an occupant of the vehicle using the display unit based on a speed of the vehicle.

10 Claims, 6 Drawing Sheets

METHOD AND SYSTEM FOR PROVIDING ENTERTAINMENT

CROSS-REFERENCE TO RELATED APPLICATIONS

The present application is based on and claims the benefit of priority to Korean Patent Application Number 10-2022-0146871, filed on Nov. 7, 2022, in the Korean Intellectual Property Office, the entire disclosure of which is incorporated herein by reference.

TECHNICAL FIELD

The present disclosure relates to a system for providing entertainment and a method for providing entertainment.

BACKGROUND

The content described in this section simply provides background information for the present disclosure and does not constitute prior art.

A device such as a head-up display (HUD) is mounted on a vehicle so that a driver of the vehicle can easily grasp driving information such as an external situation, route information, and speed while looking ahead during driving, and some technologies related to augmented reality are also applied to vehicles to further improve driving convenience for a driver.

However, in recent years, research and development on an autonomous vehicle that can drive without driver manipulation is being actively conducted, and level 2 autonomous driving technology (the system can control a speed and direction of a vehicle at the same time without intervention of a driver, but only under certain circumstances, the vehicle can change a direction on its own or control a speed to maintain the distance, and the subject of the steering remains with the driver) is being applied to mass-produced vehicles.

Furthermore, a driver of a vehicle equipped with an autonomous driving technology of level 3 (the system requests the operation of the driver only when an unexpected situation occurs and release of an autonomous driving mode is expected, the driver does not have to keep an eye on the road all the time, and the system can overtake the vehicle in front or detect and avoid obstacles on its own.) or higher does not need to intervene in driving the vehicle, such as always looking ahead or operating a steering wheel.

It is necessary to provide more diverse and high-quality entertainment to an occupant of a vehicle as well as an occupant of an autonomous vehicle while securing operation stability, when road traffic congestion occurs.

SUMMARY

According to an embodiment of the present disclosure, a system for providing entertainment mounted on a vehicle, the system for providing entertainment comprising: a display unit configured to display an image; and a control unit configured to provide a content to an occupant of the vehicle using the display unit based on a speed of the vehicle.

According to another embodiment of the present disclosure, a method for providing entertainment comprising: determining whether or not a congestion condition of a vehicle is satisfied; displaying a type of a content to be selectable by an occupant; and providing the content to the occupant of the vehicle based on a speed of the vehicle.

DETAILED DESCRIPTION

A system for providing entertainment according to one embodiment can provide a realistic content to an occupant based on a speed of a vehicle while securing stability of driving.

A system for providing entertainment according to one embodiment may secure stability of driving by providing a content to an occupant based on whether or not a congestion condition is satisfied.

The aspects of the present disclosure are not limited to the foregoing, and other aspects not mentioned herein will be clearly understood by those skilled in the art through the following descriptions.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

When it is mentioned that any component is "connected" or "coupled" to another component, it is to be understood that any component may be directly connected or coupled to another component or is connected or coupled to another component with the other component interposed therebetween.

Throughout the present specification, unless explicitly described to the contrary, "including" or "comprising" any components will be understood to imply the inclusion of other elements rather than the exclusion of any other elements.

A term "~unit," "module," or the like, described in the specification means a unit of processing at least one function or operation and may be implemented by hardware or software or a combination of hardware and software.

Unless otherwise stated, it should be noted that a description of any one embodiment may be applied to other embodiments as well.

The description of the present disclosure to be disclosed below with the accompanying drawings is intended to describe exemplary embodiments of the present disclosure, and is not intended to represent the only embodiments in which the present disclosure may be practiced.

Figure 1:
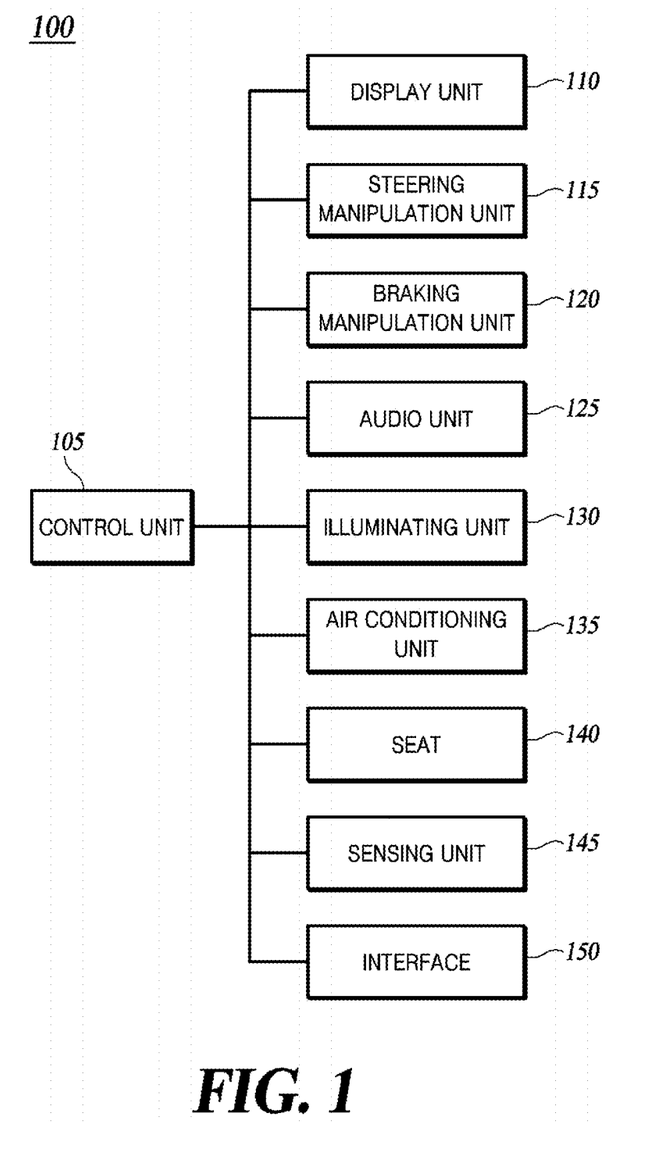
FIG. 1 is a block diagram of a system for providing entertainment according to one embodiment of the present disclosure.

FIG. 1 is a block diagram of a system for providing entertainment according to one embodiment of the present disclosure.

Figure 2:
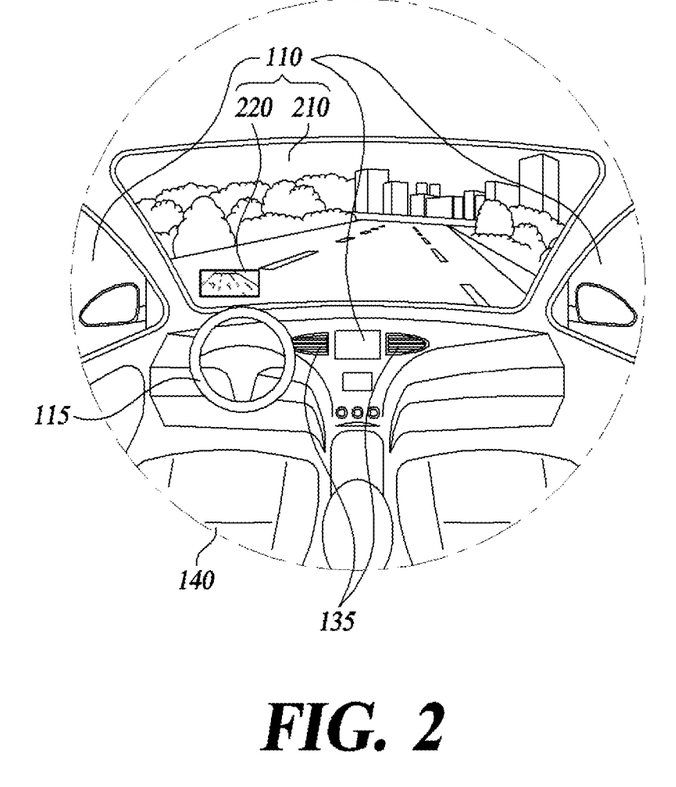
FIG. 2 is a diagram illustrating the interior of a vehicle equipped with the system for providing entertainment according to one embodiment of the present disclosure.

FIG. 2 is a diagram illustrating the interior of a vehicle equipped with the system for providing entertainment according to one embodiment of the present disclosure.

Referring to FIGS. 1 and 2, a system for providing entertainment 100 according to one embodiment of the present disclosure includes a control unit 105, a display unit 110, a steering manipulation unit 115, a braking manipulation unit 120, an audio unit 125, an illuminating unit 130, an air conditioning unit 135, a seat 140, a sensing unit 145, and an interface 150.

The system for providing entertainment 100 according to the present disclosure can provide all functions and information, such as navigation and music, provided by an infotainment system mounted in a conventional vehicle, as well as a content or a game content that provide a virtual driving environment, which will be described later.

The control unit 105 provides a content to the occupant using a device of the vehicle. Here, the device of the vehicle means the display unit 110, the steering manipulation unit 115, the braking manipulation unit 120, the audio unit 125, the illuminating unit 130, the air conditioning unit 135, the seat 140, the sensing unit 145, the interface 150, or the like. The content refers to a content providing the virtual driving environment desired by the occupant, a content providing a game using the virtual environment, a content in which the number of displayed objects changes according to the speed of the vehicle, or the like.

As an example of the content providing the virtual driving environment, images, sounds, illumination, temperature, smell, or the like related to the space, the sea, a desert, a forest, a Jurassic Park, and travel destinations may be provided to the occupant. As an example of the content for providing a game using a virtual environment, a Virtual Reality (VR) riding game in which an occupant virtually drives in a virtual environment and a VR shooting game in which an occupant virtually shoots may be provided to the occupant. As an example of the content in which the number of displayed objects changes according to the speed of the vehicle, a rhythm game (such as a method of touching a rhythm bar displayed according to the rhythm of a music), a zombie game (such as a method in which the occupant defeats a displayed zombie by touching or the like), a content (hereinafter referred to as a "fish content") in which a fish is displayed, and when the user touches the fish, information (size, shape, habitat, or the like) of the fish or the like is provided or a color is changed, or the like may be provided to the occupant.

The information on the image, illumination, sound, temperature, and smell of the above-described virtual driving environment and the information (for example, information on a driving map in a riding game, gun information in a shooting game, information on a fish, or the like) on the game content may be stored in a storage unit (not illustrated) included in the system for providing entertainment 100 or may be stored in a separate server (not illustrated), and the control unit 105 may provide a content to the occupant using this. In addition, software related to content is installed in the system for providing entertainment 100 itself or installed in the form of an application in an occupant terminal capable of interoperating with the system for providing entertainment 100, and the occupant can operate the system for providing entertainment 100 using this software.

The control unit 105 may stop the provision of the content before a predetermined time before arrival at the destination, in a collision situation, or when a congestion condition to be described later is not satisfied. Here, the occupant can be set for the predetermined time, and when it is desired to stop the provision of the content upon arrival at a destination, the predetermined time can be set to 0. In addition, when the above-described situation occurs, the control unit 105 does not immediately stop the provision of the content, but may inform the occupant of the situation through a pop-up window and/or voice guidance using the display unit 110 and/or the audio unit 125, and may allow the occupant to determine whether or not to stop the provision of the content. It should be noted that the function related to stopping the provision of the content may be configured to be turned on/off and may be omitted.

The control unit 105 may provide content to the occupant based on whether or not the congestion condition of the vehicle is satisfied. Here, the congestion condition means a case in which the intervention of the driver is relatively less required for the operation of the vehicle due to congestion of road traffic. For example, the congestion condition may include a first condition in which the speed of the vehicle is maintained at less than or equal to a set speed (for example, 30 km/h) for at least a first set time (for example, 5 minutes), a second condition in which the vehicle stops at at least a set frequency (for example, 3 times) within a second set time (for example, one minute), and a third condition in which the vehicle continues the stopped state for at least a third set time (for example, 5 seconds). The control unit 105 may determine that the congestion condition is satisfied when at least one of the first to third conditions is satisfied, and provide the content to the occupant. Conversely, the control unit 105 may not provide the content to the occupant or stop the provision of the content when the first to third conditions are not satisfied or when the speed of the vehicle exceeds the set speed (for example, 30 km/h). In this way, the control unit 105 provides the content based on whether or not the congestion condition of the vehicle is satisfied, so that driving stability can be secured while providing the content beneficial to the occupant. The occupant can change the set speed, set time, set frequency, or the like by touching the display unit 110 or using a voice command.

The display unit 110 displays an image required to provide the content. For example, in the case of providing the occupant with a virtual driving environment in the sea, the control unit 105 may control the display unit 110 so that the display unit 110 displays an image (for example, seawater, fish, algae, or the like) related to the sea can control. In addition, when the content related to a riding game or a shooting game is provided to the occupant, the control unit 105 may control the display unit 110 so that the display unit 110 displays a crack or generates vibrations according to a game situation (for example, collision, shooting, or the like). When the content of the rhythm game or zombie game is provided to the occupant, the control unit 105 may control the display unit 110 so that the display unit displays a rhythm bar or a zombie image.

The display unit 110 may include a plurality of displays such as a display installed on the front of the vehicle interior. At least a part of the display unit 110 may constitute a window of a vehicle. For example, the display unit 110 may configure a front window (windshield), a side window, a rear window, and a sunroof of a vehicle. When windows such as the front surface, side surface, and rear surface of the vehicle are composed of open windows without frames between them, the display unit 110 configures the entire open window to provide content so that the occupant can feel a more improved sense of reality.

The display unit 110 may include a panorama display. Here, the panoramic display refers to a display that is formed in a shape that is wide and partially curved to give a user the feeling of actually looking in all directions.

In this way, the display unit 110 includes the plurality of displays, constitutes a window of a vehicle, or includes a panoramic display, thereby providing a realistic content to the occupant.

The display unit 110 may display information about actual driving as well as images about the content. For example, as illustrated in FIG. 2, the display unit 110 may display an image 210 related to the content on a part and information 220 on actual driving on another part of the display unit 110. Accordingly, since the occupant can check the actual driving situation while receiving the content, stability can be secured. However, the function providing information on actual driving may be configured to be turned on/off or may be omitted.

The display unit 110 may display a guide message and an interface 150 related to the provision of the content. For example, the display unit 110 may display the guide message regarding a content provision start (for example, "start providing content", "start game", or the like) and a content provision stop (for example, "stop provision of content", "stop playing of game", or the like). The display unit 110 may display a menu image for selecting the content and a menu image for starting or stopping providing content, and the occupant may manipulate them by touch or the like. The display unit 110 may display the guide message and the interface 150 in the form of a pop-up window. The displayed screen, such as a pop-up window, may be set to disappear after a certain period of time, and the occupant may display the screen again through a specific method (for example, touch for 2 seconds, double touch, or the like). Even when the occupant manipulates the system for providing entertainment 100 using a voice command or a terminal, the display unit 110 can display a screen corresponding thereto. In addition, even when the occupant manipulates the system for providing entertainment 100 using any one of a plurality of displays, the remaining displays may also display the corresponding screens in the form of a pop-up window (multi-position pop-up). The size, position, brightness, or the like of the pop-up window displayed by the display unit 110 may be configured such that the occupant is adjustable.

In a process of providing the content, when an existing creature (for example, bug, plant, or the like) is displayed and the occupant touches it, the control unit 110 may display information (for example, information such as a dictionary definition) about the corresponding creature. In this case, the occupant may request information about the creature through a voice command, and the information about the creature may be provided with voice guidance through the audio unit 125 as well as the display unit 110.

The display unit 110 may display the interface 150 that the occupant can manipulate, and content allowing the occupant to enjoy a game using the interface 150 may be provided. For example, a game content may be provided in a format in which the display unit 110 displays a target object (for example, a bug, zombie, or the like) and the occupant attacks the target object by touch or the like.

The steering manipulation unit 115 refers to a component that the occupant manipulates to change the driving direction of the vehicle. The steering manipulation unit 115 may include a steering wheel of the vehicle, a button disposed on the steering wheel, or the like. In providing the content to the occupant, when it is necessary to separate the steering manipulation unit 115 and a steering system of the vehicle (for example, riding game), the control unit 105 may separate the steering manipulation unit 115 and the steering system. Here, the steering system refers to components other than the steering manipulation unit 115 among components necessary to change the driving direction of the vehicle, and refers to wheels and wheel axles. The steering manipulation unit 115 and the steering system may be configured to be electrically connected and separated. When the content that requires separation of the steering manipulation unit 115 and the steering system is provided to the occupant, such as a riding game, the steering manipulation unit 115 is separated from the steering system, and thus, the occupant may use the steering wheel (to change the driving direction of an object such as an in-game vehicle, a submarine, a spacecraft, or an airplane) and the button (attack, use of special skills, or the like) disposed in the steering wheel. As such, the system for providing entertainment 100 according to the present disclosure can provide the content to the occupant more realistically by using a vehicle device.

The braking manipulation unit 120 is operated so that the occupant manipulates to adjust the speed of the vehicle, such as braking the vehicle. The braking manipulation unit 120 may include a brake paddle and an accelerator paddle of the vehicle. In providing content to the occupant, when it is necessary to separate the braking manipulation unit 120 and the braking system of the vehicle (for example, riding game), the control unit 105 may separate the braking manipulation unit 120 and the braking system. Here, the braking system refers to a component excluding the braking manipulation unit 120 among components necessary for speed control such as the braking of the vehicle, and refers to an actuator, a caliper, and the like. The braking manipulation unit 120 and the braking system may be configured to be electrically connected and separated. When the content requiring separation of the braking manipulation unit 120 and the braking system, such as a riding game, is provided to the occupant, the braking manipulation unit 120 is separated from the braking system, and the occupant can use a brake paddle (braking an object such as a vehicle in the game) and an accelerator paddle (accelerating an object in the game) in the game.

The audio unit 125 may output sound related to the content. The control unit 105 may provide the sound related to the content to the occupant using the audio unit 125. For example, in the case of providing the occupant with a virtual driving environment in a forest, the control unit 105 uses the audio unit 125 so that the audio unit 125 outputs bird sounds, wind sounds, and leaves fluttering by the wind. When providing the content related to the riding game to the occupant, the control unit 105 may control the audio unit 125 so that the audio unit 125 outputs the sound of the engine of the vehicle and the sound of friction between the tire and the floor caused by a sharp turn in accordance with the game situation. When the rhythm game content is provided to the occupant, the control unit 105 may control the audio unit 125 so that the audio unit 125 outputs music. When the zombie game content is provided to the occupant, the control unit 105 may control the audio unit 125 so that the audio unit 125 outputs a zombie sound.

The illuminating unit 130 may output light in order to implement illumination for content. The control unit 105 may control the illuminating unit 130 so that the illuminating unit 130 outputs light that implements illumination for content. For example, when the virtual driving environment of the sea or space is provided to the occupant, the control unit 105 may control the illuminating unit 130 so that the illuminating unit 130 outputs black or dark blue light. When the content related to a shooting game is provided to the occupant, the control unit 105 may control the illuminating unit 130 so that the illuminating unit 130 outputs (for example, outputs a dark light and then flashes a bright light according to the situation such as shooting) light corresponding to the environment (for example, night, in the mountains, or the like) in the game and the game situation (for example, shooting, or the like). When the rhythm game content is provided to the occupant, the control unit 105 may control the illuminating unit 130 so that the illuminating unit 130 outputs light (for example, blinking) according to the rhythm.

The air conditioning unit 135 outputs air to adjust the temperature and/or odor inside the vehicle. The control unit 105 may use the air conditioning unit 135 to provide the occupant with a temperature and/or smell related to the content. For example, in the case of providing the occupant with the virtual driving environment of the desert, the control unit 105 may control the air conditioning unit 135 so that the air conditioning unit 135 outputs high-temperature air and the temperature inside the vehicle becomes equal to or similar to that of the desert air. When the virtual driving environment in the forest is provided to the occupant, the control unit 105 may control the air conditioning unit 135 so that the air conditioning unit 135 outputs air containing the smell of trees. When the content related to the shooting game is provided to the occupant, the control unit 105 may control the air conditioning unit 135 so that the air conditioning unit 135 outputs air containing the smell of gunpowder. When fish content is provided to the occupant, the control unit 105 may control the air conditioning unit 135 to output the smell of the sea.

The seat 140 is configured such that the occupant can sit on the seat 140. The seat 140 may be configured to be movable and/or capable of generating vibration. The control unit 105 may control the seat 140 so that the seat 140 moves, generates vibration, or generates heat or wind according to the content provided to the occupant. For example, when the content related to a riding game is provided to the occupant, the control unit 105 may control (for example, tilt back, tilt forward, tilt left, or tilt right) the seat 140 according to the situation (for example, acceleration, deceleration, right shape turn, or left sharp turn) of the riding game. In addition, when the content related to the shooting game is provided to the occupant, the control unit 105 may control (for example, tilt, vibrate, or the like) the seat 140 in accordance with the situation (for example, shooting, being hit, or the like) of the shooting game.

As such, the system for providing entertainment 100 according to the present disclosure provides a realistic 4D content to the occupant using the devices of the vehicle such as the display unit 110, the steering manipulation unit 115, the braking manipulation unit 120, the audio unit 125, the illuminating unit 130, the air conditioning unit 135, or the seat 140, and thus, there is an effect of enabling the occupant to spend the moving time beneficially.

The sensing unit 145 may obtain position information of the occupant in the vehicle by sensing the pressure applied to the seat 140 inside the vehicle and the body temperature of the occupant. The sensing unit 145 may include a plurality of sensors. Based on the information acquired by the sensing unit 145, the control unit 105 may provide the content to the occupant. For example, when the sensing unit 145 detects that the location of the occupant in the vehicle is a passenger seat, the control unit 105 may display an image and a guide message related to content using a display located closest to the passenger seat, such as a display composed of the occupant and a passenger seat window.

Figure 3A:
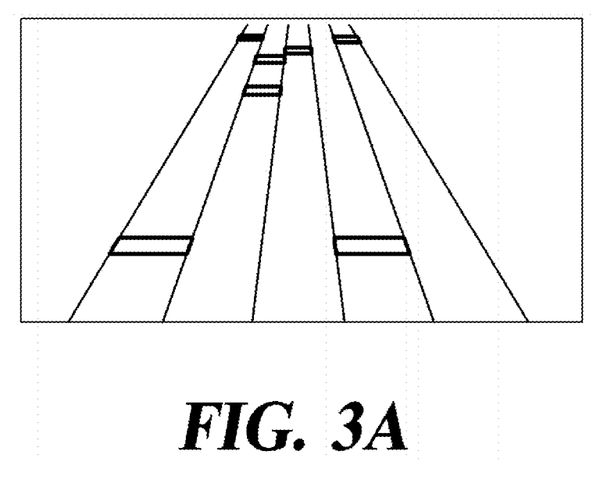
FIGS. 3A and 3B are diagrams for explaining providing a content based on vehicle speed according to one embodiment of the present disclosure.
Figure 3B:
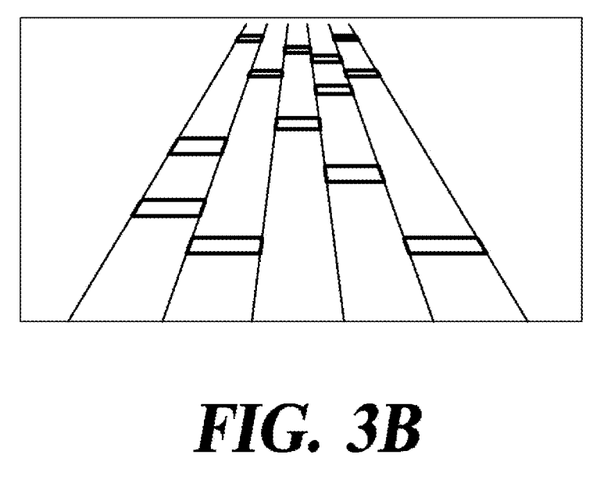

FIGS. 3A and 3B are diagrams for explaining providing a content based on vehicle speed according to one embodiment of the present disclosure.

Referring to FIGS. 1 to 3B, the control unit 105 may provide the content to the occupant based on the vehicle speed. For example, as illustrated in FIG. 3, in a case where the rhythm game content is provided to the occupant, when the speed of the vehicle is relatively fast (for example, 30 km/h), a relatively small number of rhythm bars may be displayed as illustrated in FIG. 3A, and when the speed of the vehicle is relatively slow (for example, 5 km/h), a relatively large number of rhythm bars may be displayed as illustrated in FIG. 3B. In addition, when the zombie game content is provided to the occupant, a relatively small number of zombies may be displayed when the speed of the vehicle is relatively fast, and a large number of zombies may be displayed when the speed of the vehicle is relatively slow. When the fish content is provided to the occupant, a relatively small number of fish may be displayed when the vehicle speed is relatively fast, and a relatively large number of fish may be displayed when the vehicle speed is relatively slow. Conversely, when the vehicle accelerates while providing fish content, the number of displayed fish decreases as the vehicle accelerates, and all fish may disappear when the vehicle speed exceeds a set speed (for example, 30 km/h). That is, the control unit 105 may provide the content to the occupant by controlling the display unit 110 so that the speed of the vehicle and the number of objects (for example, rhythm bars, zombies, fish, or the like) are in inverse proportion. As described above, the system for providing entertainment 100 according to the present disclosure is configured to provide content to the occupant based on the speed of the vehicle, thereby securing driving stability while providing useful content to the occupant.

When the control unit 105 provides the content to the occupant based on the speed of the vehicle, not only the display unit 110 but also other devices of the vehicle may be used together. For example, the audio unit 125 may be controlled so that the volume of sound output is changed according to the speed of the vehicle, the air conditioning unit 135 may be controlled so that the intensity of the air output is changed according to the speed of the vehicle, or the inclination of the seat 140 may be adjusted according to the speed of vehicle to provide a good quality content to the occupant.

Figure 4:
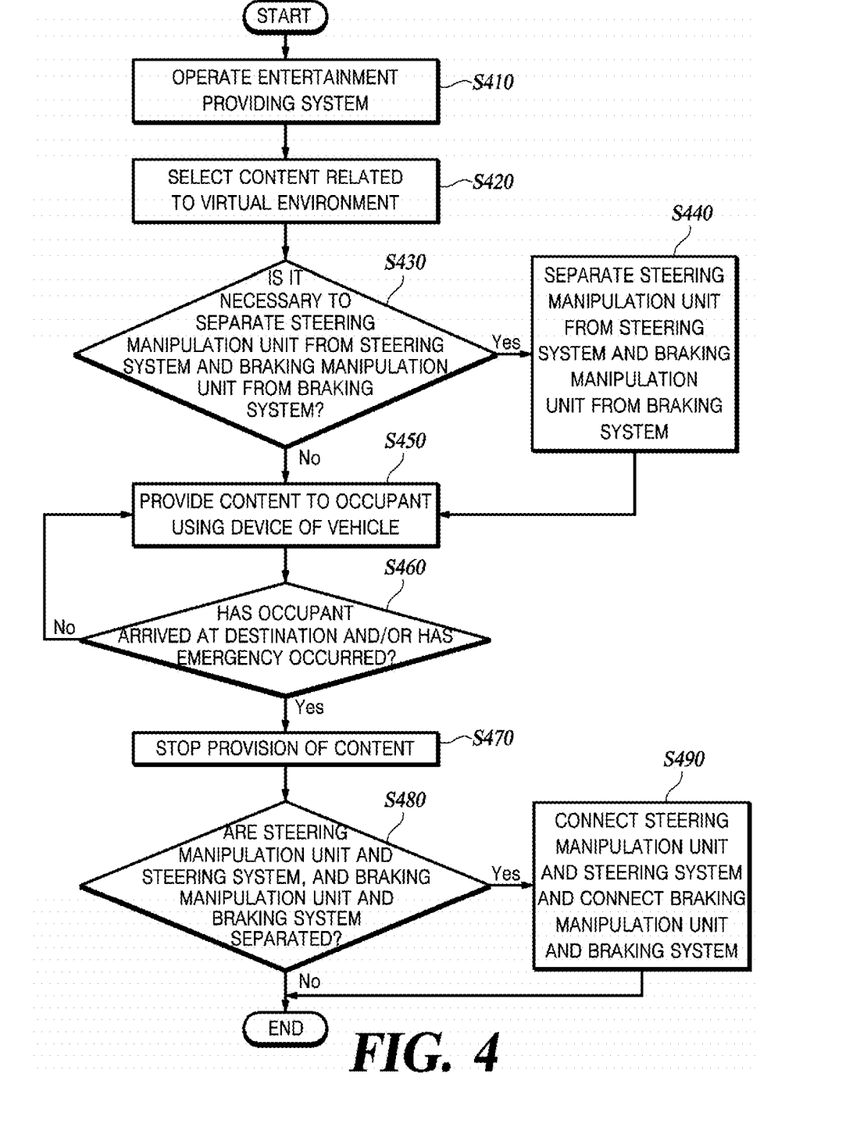
FIG. 4 is a flowchart of a method for providing entertainment according to one embodiment of the present disclosure.

FIG. 4 is a flowchart of a method for providing entertainment according to one embodiment of the present disclosure.

Figure 5:
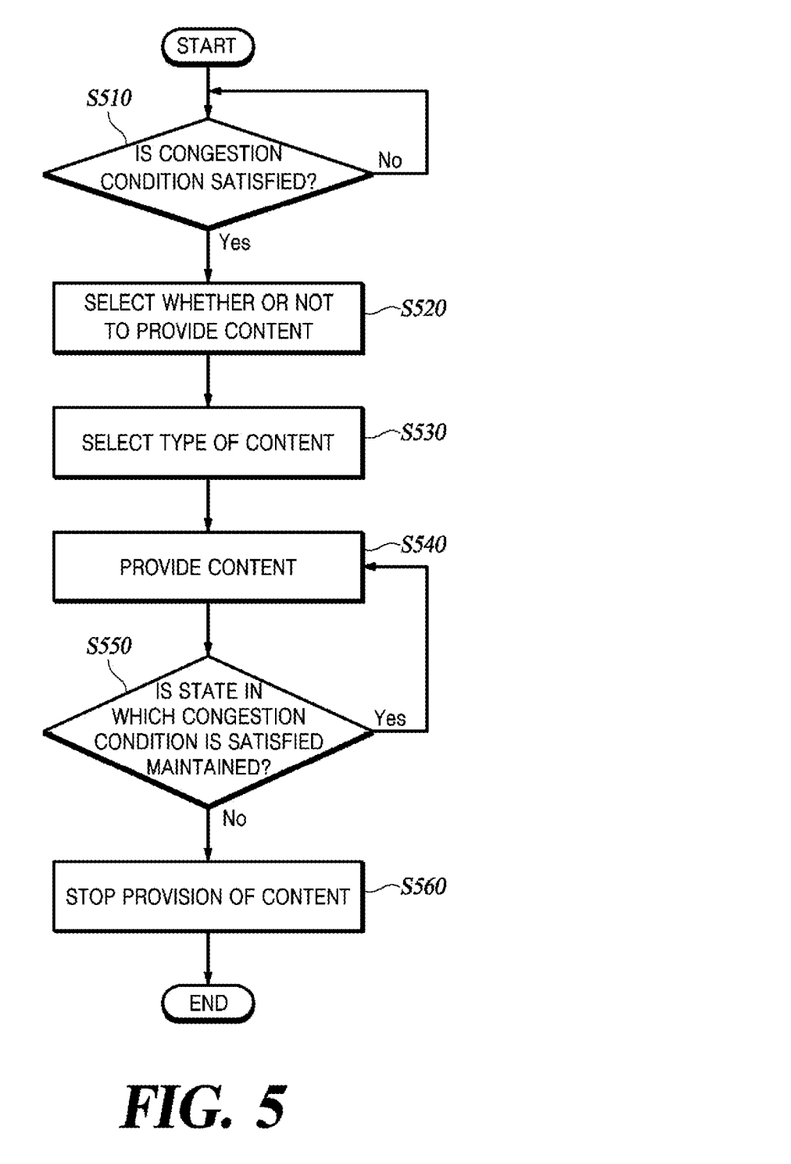
FIG. 5 is a flowchart of a method for providing entertainment according to another embodiment of the present disclosure.

FIG. 5 is a flowchart of a method for providing entertainment according to another embodiment of the present disclosure.

Prior to a detailed description of the method for providing entertainment according to the present disclosure with reference to FIGS. 4 and 5, descriptions overlapping with those of the above-described system for providing entertainment 100 will be omitted, but it should be noted that the contents of the system for providing entertainment 100 can also be applied to the method for providing entertainment to the extent that it is not arranged.

Referring to FIG. 4, the occupant of the vehicle operates the system for providing entertainment (S410). The occupant can operate the system for providing entertainment 100 through the interface 150 provided in the system for providing entertainment 100, the terminal interoperable with the system for providing entertainment 100, and the voice command.

The occupant selects content (S420). The occupant may select the content provided by the system for providing entertainment 100. For example, the occupant may select whether to receive the content related to the virtual driving environment or the game content using the virtual environment such as the riding game. The occupant can select the type (for example desert, forest, sea, Jurassic Park, or the like) of the virtual driving environment and the type (for example riding game, shooting game, or the like) of the game. In this case, a menu for selecting content may be displayed as the image through the display unit 110 and/or guided by voice through the audio unit 125. The occupant may select the content through the terminal, the interface 150, and the voice command.

The control unit 105 determines whether or not it is necessary to separate the steering manipulation unit 115 from the steering system and the braking manipulation unit 120 from the braking system (S430). The control unit 105 may determine that it is necessary to separate the steering manipulation unit 115 from the steering system, and the braking manipulation unit 120 from the braking system when the occupant selects the content related to the riding game. When the occupant simply selects the content that provides the virtual driving environment or the content that does not require manipulation of the steering wheel, such as the shooting game, the control unit 105 may determine that it is not necessary to separate the steering manipulation unit 115 from the steering system, and the braking manipulation unit 120 from the braking system.

When the control unit 105 determines that it is necessary to separate the steering manipulation unit 115 from the steering system and the braking manipulation unit 120 from the braking system, they are separated from each other (S440). The steering manipulation unit 115 and the steering system and the braking manipulation unit 120 and the braking system may be electrically connected. The control unit 105 can use the steering manipulation unit 115 and the braking manipulation unit 120 for the provision of the content by separating the steering manipulation unit 115 from the steering system and the braking manipulation unit 120 from the braking system.

The control unit 105 provides the content to the occupant using the device of the vehicle (S450). Here, the device of the vehicle includes the display unit 110, the steering manipulation unit 115, the braking manipulation unit 120, the audio unit 125, the illuminating unit 130, the air conditioning unit 135, the seat 140, the interface 150, or the like.

The control unit 105 may determine whether or not arrival at the destination and/or an emergency has occurred (S460), and may stop the provision of the content when arrival or imminent arrival at the destination or the emergency such as collision has occurred (S470). In this case, the control unit 105 may inform the occupant of facts such as the arrival at the destination, the imminent arrival at the destination, the occurrence of the emergency, and the stop of the provision of the content provision using the display unit 110 and/or the audio unit 125.

The control unit 105 determines whether or not the steering manipulation unit 115 and the steering system, and the braking manipulation unit 120 and the braking system are separated (S480), and when they are separated, they are connected again (S490). When the steering manipulation unit 115 and the steering system are separated and the braking manipulation unit 120 and the braking system are separated, the control unit 105 connects them again together with stopping the provision of the content so that the steering manipulation unit 115 and the braking manipulation unit perform original functions thereof.

Referring to FIG. 5, the control unit 105 determines whether or not the congestion condition of the vehicle is satisfied (S510). Here, the congestion condition may include the above-described first to third conditions, and the control unit 105 may determine that the congestion condition is satisfied when at least one of the first to third conditions is satisfied.

The occupant of the vehicle selects whether or not to provide the content (S520). The occupant of the vehicle may select whether or not to provide content through the terminal, the interface 150, and the voice command.

The occupant selects the type of content to be provided (S530). The occupant may select the content using the menu displayed through the display unit 110 or the like. For example, the occupant may select the content to be provided from among the content provided with the virtual driving environment and the game content (riding game, shooting game, rhythm game, or the like). However, this process may be omitted according to the setting of the occupant, and the content previously selected by the occupant may be provided.

The control unit 105 provides content to the occupant using a vehicle device (S540). Here, the vehicle device includes the display unit 110, the steering manipulation unit 115, the braking manipulation unit 120, the audio unit 125, the illuminating unit 130, the air conditioning unit 135, the seat 140, the interface 150, or the like.

The control unit 105 determines whether or not a state in which the congestion condition of the vehicle is satisfied is maintained (S550). The control unit 105 may determine that the state in which the congestion condition of the vehicle is satisfied is not maintained when the first to third conditions are not satisfied or the vehicle speed exceeds the set speed (for example, 30 km/h).

The control unit 105 stops the provision of the content when the state in which the congestion condition of the vehicle is satisfied is not maintained (S560). By stopping the provision of content when the state in which the congestion condition of the vehicle is satisfied is not maintained, it is possible to secure driving stability.

According to one embodiment, the system for providing entertainment has an effect of securing driving stability while providing a realistic content to an occupant based on the speed of a vehicle.

According to one embodiment, the system for providing entertainment has an effect of securing stability of driving by providing the content to the occupant based on whether or not a congestion condition is satisfied.

In the flow chart of the present specification, it is described that each process is sequentially executed, but this is merely an example of the technical idea of one embodiment of the present disclosure. In other words, those skilled in the art to which one embodiment of the present disclosure belongs can change and execute the order described in the flowchart/timing diagram within the range that does not deviate from the essential characteristics of the embodiment of the present disclosure, or can execute one or more process in parallel to apply various modifications and variations, and thus, the flow chart/timing chart is not limited to a time-series sequence.

Various implementations of the systems and techniques described herein may be implemented by a digital electronic circuit, an integrated circuit, a field programmable gate array (FPGA), an application specific integrated circuit (ASIC), a computer hardware, a firmware, software, and/or a combination thereof. These various implementations may include being implemented as one or more computer programs executable on a programmable system. The programmable system includes at least one programmable processor (which may be a special purpose processor or may be a general-purpose processor) coupled to receive data and instructions from and transmit data and instructions to a storage system, at least one input device, and at least one output device. Computer programs (also known as programs, software, software applications or code) contain instructions for a programmable processor and are stored on a "computer readable recording medium".

The computer-readable recording medium includes all types of recording devices in which data that can be read by a computer system is stored. These computer-readable recording media may be non-volatile or non-transitory media such as a ROM, a CD-ROM, a magnetic tape, a floppy disk, a memory card, a hard disk, a magneto-optical disk, and a storage device, and may further include a transitory medium such as a data transmission medium. In addition, the computer-readable recording media may be distributed in computer systems connected through a network, and computer-readable codes may be stored and executed in a distributed manner.

Various implementations of the systems and techniques described herein may be implemented by a programmable computer. Here, the computer includes a programmable processor, a data storage system (including volatile memory, non-volatile memory, or other types of storage systems, or combinations thereof) and at least one communication interface. For example, a programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A system for providing entertainment mounted on a vehicle, the system comprising:
    a display unit configured to display an image; and
    a control unit configured to provide a content to an occupant of the vehicle using the display unit based on a speed of the vehicle,
    wherein the control unit provides the content to the occupant based on whether or not a congestion condition of the vehicle is satisfied,
    wherein the congestion condition includes at least one of:
        a first condition which is satisfied when the speed of the vehicle is maintained at less than or equal to a set speed for at least a first set time;
        a second condition which is satisfied when the vehicle stops at least a set frequency within a second set time; and
        a third condition which is satisfied when the vehicle continues in a stopped state for at least a third set time, and
    wherein the control unit automatically stops the provision of the content when all of the first condition, the second condition and the third condition are not satisfied.

2. The system for providing entertainment of claim 1, wherein the control unit stops the provision of the content when the speed of the vehicle is at least the set speed.

3. The system for providing entertainment of claim 1, wherein the control unit controls the display unit so that a number of objects displayed when providing the content is changed according to the speed of the vehicle.

4. The system for providing entertainment of claim 3, wherein the control unit controls the display unit so that the speed of the vehicle and the number of objects is inversely proportional.

5. The system for providing entertainment of claim 1, wherein the control unit provides the content to the occupant using a device of the vehicle including the display unit.

6. The system for providing entertainment of claim 5, wherein the device of the vehicle further includes one or more of a steering manipulation unit, a braking manipulation unit, an audio unit, an illuminating unit, an air conditioning unit, a seat, and a sensing unit.

7. A method for providing entertainment comprising:
    determining whether or not a congestion condition of a vehicle is satisfied;
    displaying a type of a content to be selectable by an occupant; and
    providing the content to the occupant of the vehicle based on a speed of the vehicle,
    wherein the congestion condition includes at least one of:
        a first condition which is satisfied when the speed of the vehicle is maintained at less than or equal to a set speed for at least a first set time;
        a second condition which is satisfied when the vehicle stops at least a set frequency within a second set time; and
        a third condition which is satisfied when the vehicle continues in a stopped state for at least a third set time, and
    automatically stopping the provision when all of the first condition, the second condition and the third condition are not satisfied.

8. The method for providing entertainment of claim 7, further comprising selecting whether or not to provide the content.

9. The method for providing entertainment of claim 7, wherein the content is provided to the occupant using a device of the vehicle, and
    the device of the vehicle includes at least one of a display unit, a steering manipulation unit, a braking manipulation unit, an audio unit, an illuminating unit, an air conditioning unit, and a seat.

10. The method for providing entertainment of claim 9, wherein the providing of the content includes controlling the seat according to the content.

* * * * *